April 1, 1958 — E. S. TUPPER — 2,828,502
BOTTLE CLEANER
Filed Jan. 12, 1955 — 3 Sheets-Sheet 1
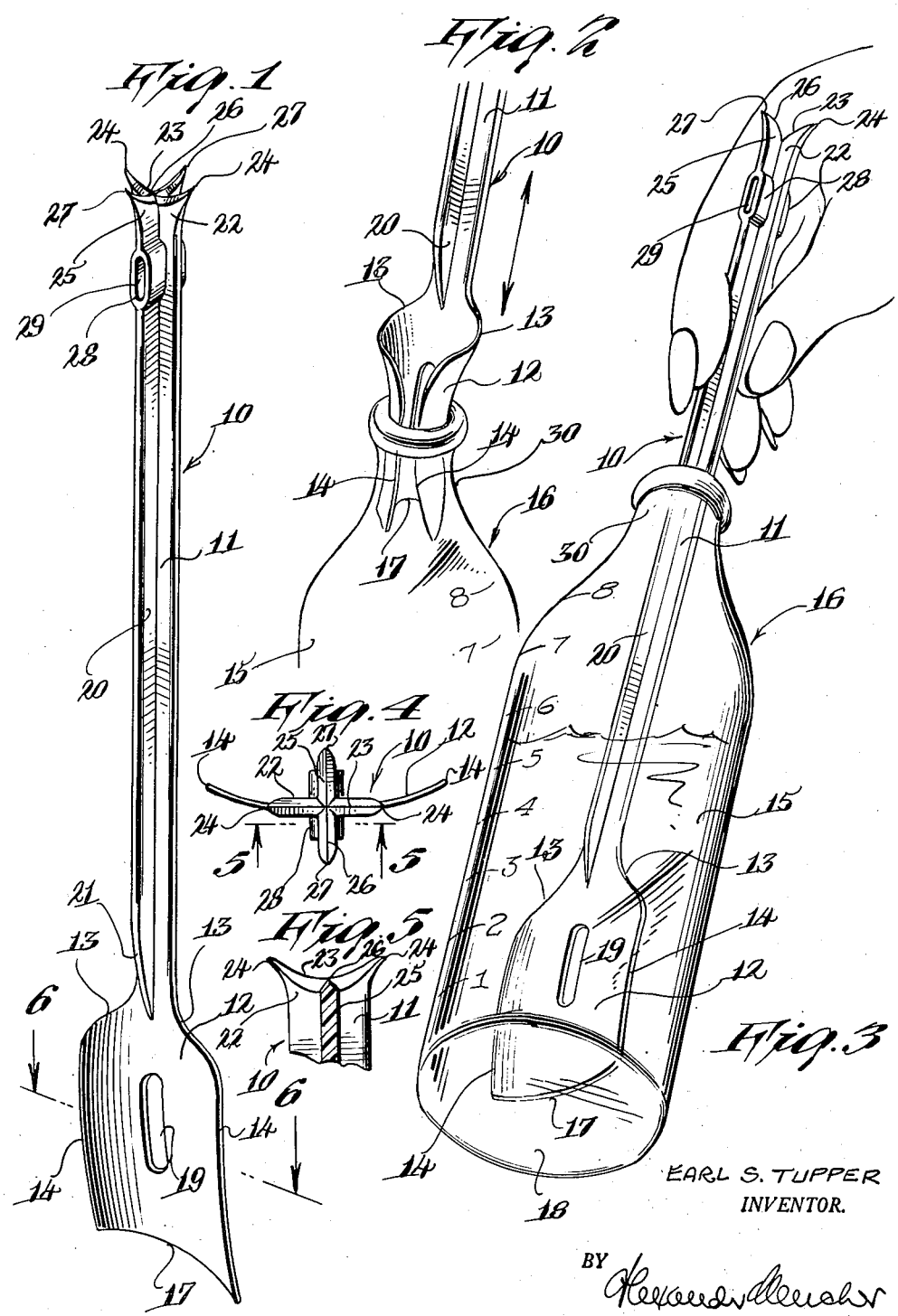
EARL S. TUPPER
INVENTOR.

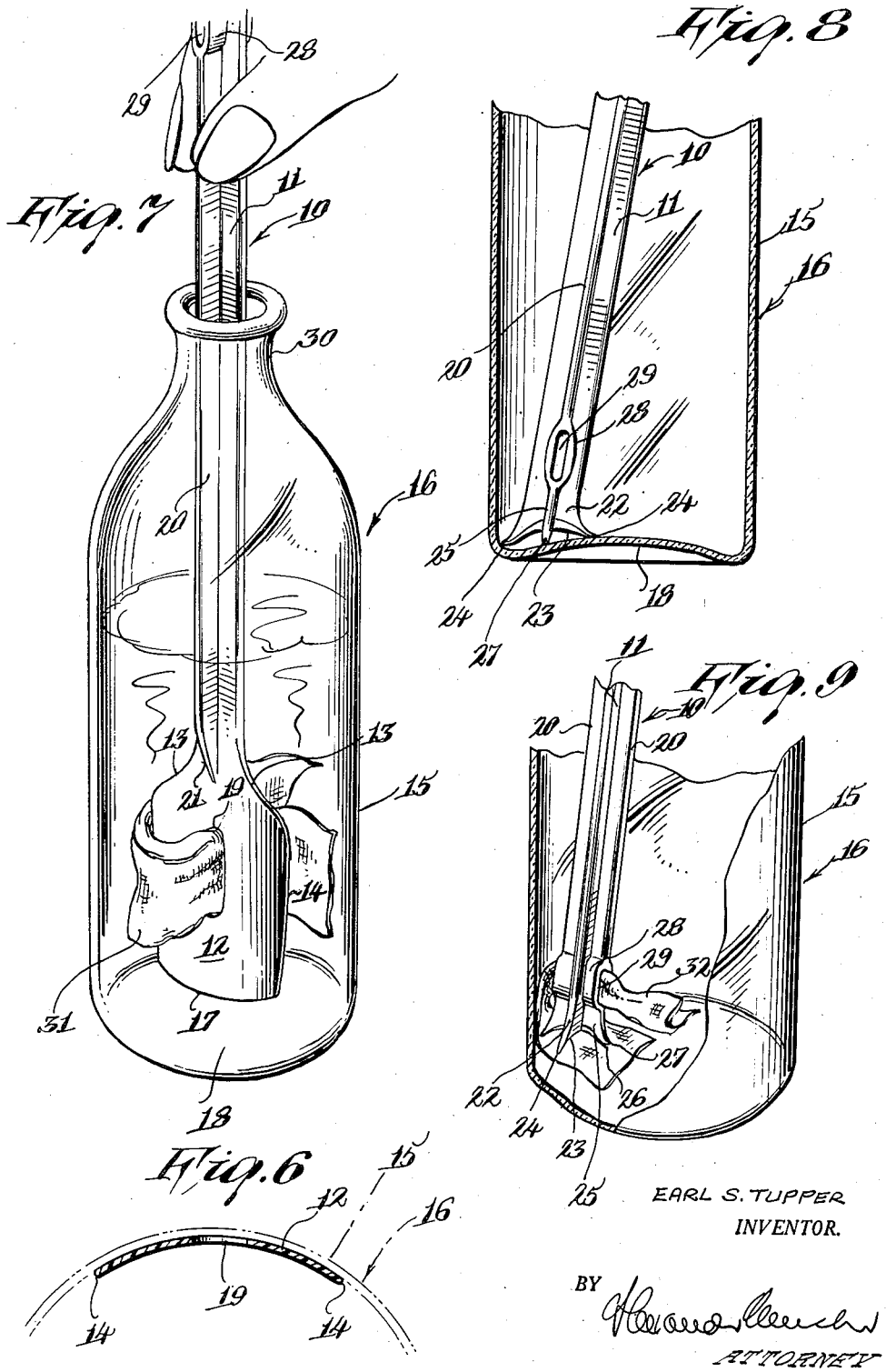

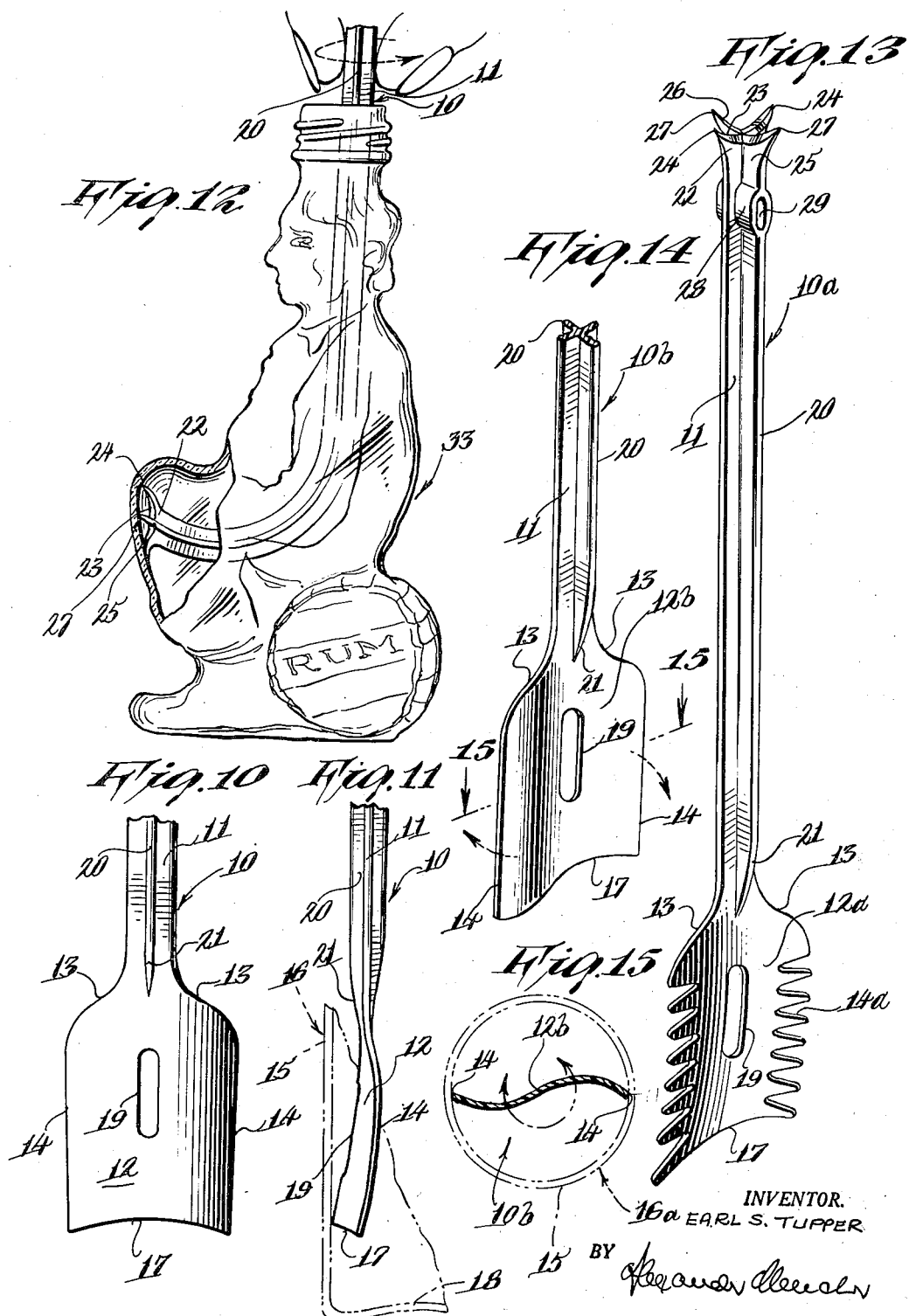

United States Patent Office 2,828,502
Patented Apr. 1, 1958

2,828,502

BOTTLE CLEANER

Earl S. Tupper, Upton, Mass.

Application January 12, 1955, Serial No. 481,351

7 Claims. (Cl. 15—121)

This invention relates generally to a cleaning implement for the interior of vessels but more specifically to a bottle cleaning implement subject to local deformation at pressure areas and further including a deformable swabbing and scraping head adapted to be forced into a roll to permit the passage of the same downwardly through the narrow neck of the vessel after which the head will return to full size within the vessel for cleaning the interior thereof.

A main object of the invention resides in a non-bristle type of implement suitable for use as a bottle cleaner and which is sanitary, efficient, economical, durable, cleanable and convenient in use.

Another object of the invention herein resides in the provision of a bottle cleaning implement at least the head of which is subject to be curvilinearly flexed along one of the axles when subjected to compression to permit the passage of the same downwardly through the narrow neck of a bottle or other vessel after which the head will spring back to its full dimensions in the interior or at the exterior of the bottle.

Another object of the invention resides in the provision of a plastic cleaning implement of the above characteristics which includes an elongated and integrally formed handle of thicker gauge and which is nevertheless subject to local deformation at any preselected areas to permit the cleaning of the interior of irregularly shaped bottles and vessels, the handle deformation taking place in accordance with the imposed pressures induced by the interior shape of the bottle or vessel.

A further feature of the invention resides in the provision of a plastic cleaning implement of the above characteristics wherein the head portion at the end of the handle of the implement may be used for scraping the interior walls of the bottle or vessel or may be used in conjunction with a swabbing cloth for swabbing the interior of the bottle.

A further feature of the invention resides in the provision of a plastic cleaning implement of the above type wherein the handle portion at the end thereof remote from the scraping and swabbing head is provided with a relatively rigid scraping surface of smaller size than the head and particularly adapted for removing dirt or the like from hard-to-get-at areas within the bottle.

A still further feature of the invention resides in the provision of a plastic cleaning implement of the above characteristics wherein the said relatively rigid scraping end of the handle may be used with a swabbing cloth in a novel manner.

A further feature of the invention resides in the provision of a plastic cleaning implement of the above characteristics wherein the slightly curved scraping and swabbing head is formed of deformable material presenting a pair of vertical scraping edges adapted to be brought against the interior vertical sides of the bottle or vessel and a horizontal lower scraping edge adapted to be employed across the bottom of the bottle or vessel.

A still further feature of the invention resides in the provision of a plastic cleaning implement for the interior of vessels of the above characteristics which is preferably formed of thermoplastic material such as polyethylene or other substances having similar physical characteristics including treated styrenes and the vinyls and derivatives, all being locally deformable and resilient yet capable of withstanding and yielding to shock without breakage or fracture and further being flexible, and sufficiently soft for scraping the interior of the bottle without scratching the same. In addition, the material used is non-absorptive to and is not readily wetted by water, odorless, resistant to acids, alkalis, solvents and other chemicals at ordinary temperatures. Moreover, the material does not soften far below the boiling point of water and is resistant to mildews, micro-organisms, and insects. Furthermore, the cleaning implement is capable of assuming different contours to enable easy storage and transportation when quarters are cramped.

Another object of the invention resides in the provision of a sanitary plastic bottle cleaning implement for commercial, industrial and consumer use which is strong, durable, resistant to wear, tear, shocks of handling and impact, is electrically non-conductive and heat insulating and is capable of repeated use without wearing out and losing its shape-retaining characteristics.

These objects and other incidental ends and advantages of the invention will hereinafter appear in the progress of the disclosure and as pointed out in the appended claims.

Accompanying this specification are drawings showing preferred forms of the invention, wherein:

Figure 1 is a perspective view of a preferred embodiment of the present invention;

Figure 2 is a fragmentary perspective view showing a rounded conformation of the scraping and swabbing head at the narrow neck of a vessel for passage therethrough;

Figure 3 is a perspective view showing the invention in operative use within a vessel for cleaning and scraping the interior walls thereof;

Figure 4 is an end elevational view thereof looking from the end of the handle remote from the head portion;

Figure 5 is a fragmentary longitudinal sectional view thereof taken along the plane 5—5 of Figure 4;

Figure 6 is a transverse sectional view thereof taken along the plane 6—6 of Figure 1 and showing in phantom the side wall of the bottle and the corresponding curvature of the head of the implement;

Figure 7 is a perspective view showing the invention in operative use within a vessel or bottle in cooperation with a swabbing cloth;

Figure 8 is a view shown partly in section and partly in elevation showing the end of the handle remote from the head portion being employed for scraping an inaccessible area within the bottle;

Figure 9 is a perspective view shown partly broken away showing the device as employed in Figure 8 only in cooperation with a swabbing cloth;

Figure 10 is a front elevational view of the scraping and swabbing head and the adjacent portion of the handle;

Figure 11 is a fragmentary end elevational view of the scraping head and the adjacent portion of the handle and showing in phantom the side wall of the bottle or vessel and the employment of the lower scraping edge of the head therealong;

Figure 12 is a fragmentary side elevational view shown partly in section and illustrating the application of the handle for scraping the interior of an irregularly shaped vessel;

Figure 13 is a perspective view of a modified form of the present invention;

Figure 14 is a fragmentary perspective view of a still further modified form of the present invention;

Figure 15 is a transverse sectional view thereof taken along the plane 15—15 of Figure 14 and showing in phantom the side wall of a vessel and the cooperation therewith of the scraping edges of the head member.

In accordance with the invention and the forms shown, Figures 1–12 illustrate a vessel cleaning implement indicated generally at 10 and including an elongated flat handle 11 of heavy gauge, deformable and resilient plastic substantially as illustrated.

Handle 11 is integrally formed at one end with an enlarged scraping and swabbing head 12 of relatively thin gauge and hence of facile deformability joining handle 11 along rounded edges 13, the head 12 being curved in cross-section and adapted to follow the contour of the inside of the vessel (Figure 6). Head 12 further includes a pair of vertical scraping edges 14 adapted to engage the side walls 15 of a vessel inclusive of a narrow neck type of bottle as indicated generally at 16, the head also including a horizontal lower curvilinear edge 17 adapted to scrape the bottom wall 18 of the bottle. A central, elongated slot or cut-out 19 having rounded ends for a purpose which will hereinafter become clear is provided in head 12.

Elongated handle 11 along the opposite faces has integrally formed therewith, along the axis and at substantially right angles thereto laterally aligned reinforcing ribs 20 which merge with the head 12 along tapered edges 21. The end of handle portion 11 remote from head 12 is integrally formed with a cleaning and scraping element such as tail-shaped enlargement 22 formed with an arcuate end having the opposite faces thereof bevelled to form the arcuate scraping edge 23, substantially as illustrated. It will be noted that the arcuate scraping edge 23 forms with the outwardly flared sides of the enlargement 22 the points 24.

The ribs 20 cooperate to form a unitary rib which is integrally formed at the end thereof remote from the head 12 with a corresponding cleaning and scraping element such as a tail-shaped enlargement 25 which terminates in an arcuate end having the opposite surfaces thereof bevelled towards an arcuate scraping edge 26, the edge 26 forming with the outwardly flared sides of the enlargement 25 the points 27. It will be noted that the arcuate scraping edges 23, 26 and the points 24, 27 all lie substantially on a single imaginary spherical surface.

Ribs 20 near the tail-shaped end 25 thereof are integrally formed with a transverse enlargement 28 having a vertically disposed flattened bore 29 which pierces handle 11 for a purpose which will hereinafter become clear.

Because of the relatively thin gauge of material forming head 12, it is possible to introduce said head into a narrow neck or mouth of a vessel by folding the vertical scraping edges 14 together (Figure 2) to permit the head to be passed downwardly through the neck 30 of vessel 16, after which the head will return to full overall dimension as shown in Figure 3. Thus, head 12 may initially be compressed by hand along the vertical axis to form a roll for introduction into a narrow neck vessel for either passage through or cleaning the interior walls thereof and this in no way will limit the return to full original dimensions of the head when it passes beyond such confined quarters to permit maximum scraping and cleaning capacity. The neck interior is cleanable either during introduction or when head 12 is withdrawn and rollably compressed when passing from the larger to the confined interior of the vessel.

Although it is preferable to utilize the same material in the formation of handle and head members, it is understood that any variation but maintenance of physical properties may be resorted to. Furthermore, both the head and handle may be formed by any of the known forming methods including compression, injection and blow molding as well as vacuum forming.

The rigidity afforded by the rib elements 20 causes the normally self shape-retaining handle to be less deformable than head 12, but it is to be noted that the handle is sufficiently flexible in spite of the relatively thick gauge and ribs 20 to be flexed where necessary (Figure 12) as will appear.

According to one manner of use, the implement may be held by handle 11 to direct head 12 into the interior of the bottle 16 when the latter has previously been filled with water or cleaning solution whereby the vertical edges 14 may scrape the vessel side wall 15 and the lower edge 17 may scrape the vessel bottom wall 18. According to another manner of use, a swabbing cloth 31 may be inserted through the opening 19 (Figure 7) and drawn across one of the vertical edges 14 permitting the interior of bottle 16 to be swabbed. In either event the edges of the head are sufficiently rigid to remove dirt or the like during movement of the implement while at the same time are sufficiently soft to avoid scratching the interior of the bottle.

As shown in Figure 8, the implement may also be inverted and the curved scraping edges 23, 26 and points 24 and 27 are employed for scraping the interior of the bottle at the juncture of the bottom wall 18 with the side wall 15 and at other relatively inaccessible places. Pressure on points 24 and 27 control the curvature of edges 23 and 26. Due to the heavier gauge of handle 11 and due to ribs 20, the scraping edges 23, 26 and points 24, 27 afford greater rigidity and the said corresponding elements relative to head 12 may therefore be employed for the removal of dirt and impurities which require greater scraping action or are at inaccessible places.

Finally as shown in Figure 9, the curved scraping edges 23 and 26 and points 24 and 27 may be employed in conjunction with a swabbing means such as cloth 32 which passes through the bore 29 and is adapted to be drawn across the undersurface of the said scraping edges and said points. The deformability of handle 11 permits the local bending of the handle to direct the head 12 or as shown in Figure 12 the scraping edges 23 and 26 within the irregularly shaped bottom 33.

It will be noted that the curvature of head 12 may conform to the internal curvature of vessel 16 (Figure 6) permitting maximum area of contact therebetween for frictionally removing particles of dirt or the like. Such curvature also contributes to the normally shape-retaining condition of head 12. By movement of head 12 when side edge 14 engages the interior wall of the vessel with or without bottom edge 17 engaging the bottom vessel wall 18 a good scraping action is accomplished within the vessel interior. This type of rotational movement of the implement is applicable to the handle end having scraping edges 23 and 26 and points 24 and 27. The rigidity of the handle is of course facilitated by the rib structure disclosed.

Referring now and particularly to Figure 13, there is shown a modified form of the invention indicated generally by numeral 10a and different from the previous form in the provision of a scraping or swabbing head 12a provided along the vertical edges thereof with teeth 14a. Such teeth 14a will provide greater adaptability to these vertical edges as in scraping elevations and depressions as well as providing a saw tooth edge for vertical motion in removal of hardened deposits.

Referring now particularly to Figures 14 and 15, there is shown a further modified form of the present invention indicated generally by numeral 10b and differing from the previous forms in the provision of a scraping and swabbing head 12b of substantially S-shape in cross-section. Thus, the lateral dimension between the vertical scraping edges 14 provided thereby can be simultaneously compressed and expanded depending upon the interior dimensions of the vessel and the vessel walls 16a cleaned and scraped by rotating the handle. The head 12b may also be moved or displaced linearly with respect to the scraping edges.

In other respects the forms of the invention shown in Figures 13-15 are the same as that shown in Figures 1-12 and like reference numerals identify like parts throughout the several views. It is understood that the above forms of the invention apply to differently shaped cleaning implements other than those disclosed. It is further to be noted and as has been mentioned that the cleaning implement of the invention is a more economical and more efficient device than the conventional brush in that the device is easier to clean, cheaper to manufacture, more convenient and better to control and capable of being more easily sterilized than otherwise.

It is distinctly understood that minor changes and variations in the material, integration, location, arrangement and size of parts may all be resorted to for practicing the invention without departing from the spirit of the invention and the scope of the appended claims.

I claim:

1. A plastic cleaning implement adapted for over-all dimension reduction for passage through and operation on narrower confines of a vessel and capable of subsequent return to full over-all dimensions in the larger confines of the vessel comprising a locally deformable and pressure-sensitive integral and bladed form of head member of relatively thin gauge and having scraping edges adapted to engage the side and bottom walls of the vessel, said head member being normally curved about the longitudinal axis thereof to maintain normal self shape-retaining characteristics, and an elongated solid handle of lesser width and thicker gauge and being locally deformable and less sensitive to pressure than said head member to conform with irregular passages of the vessel, said handle being integrally formed and coaxial with said head member and of the same material and capable of being flexed under local pressure to direct the head member within the vessel.

2. A plastic cleaning implement adapted for over-all dimension reduction for passage through and operation on narrower confines of a vessel and capable of subsequent return to full over-all dimensions in the larger confines of the vessel comprising a locally deformable and pressure-sensitive integral and bladed form of head member of relatively thin gauge and having scraping edges adapted to engage the side and bottom walls of the vessel, said head member being normally curved about the longitudinal axis thereof to maintain normal self shape-retaining characteristics and an elongated solid handle integrally formed with said head member and of the same material, said head member having a central slot along said longitudinal axis and intermediate the height thereof to receive a swabbing element therethrough for cooperation with said scraping edges.

3. A cleaning implement adapted for over-all dimension reduction for passage through and operation on narrower confines of a vessel and capable of subsequent return to full over-all dimensions in the larger confines of the vessel comprising a locally deformable and pressure-sensitive integral and bladed form of head member of relatively thin gauge having side edges adapted to engage the side walls of the vessel and a bottom edge adapted to engage the bottom wall of the vessel, said side edges being adapted to be rolled together to permit passage of said head member downwardly through the narrow confines of the vessel and subsequent return to full size therewith, said head member being normally curved along the longitudinal axis thereof to maintain normal self shape-retaining characteristics thereof, a flat elongated and locally deformable handle of heavier gauge than the head member and integrally formed with said head member, and longitudinally extending aligned ribs integrally formed on opposite faces of said handle, said ribs at one end merging with said head member, said handle and ribs being sufficiently rigid to direct said head member within the vessel while at the same time being capable of flexing under local pressure to permit the entry thereof into irregularly shaped vessels, said head member, handle and ribs being integrally formed of a thermoplastic having physical properties similar to polyethylene.

4. A cleaning implement adapted for over-all dimension reduction for passage through and operation on narrower confines of a vessel and capable of subsequent return to full over-all dimensions in the larger confines of the vessel comprising a locally deformable and pressure-sensitive integral and bladed form of head member of relatively thin gauge having side edges adapted to engage the side walls of the vessel and a bottom edge adapted to engage the bottom wall of the vessel, said side edges being adapted to be rolled together to permit passage of said head member downwardly through the narrow confines of the vessel and subsequent return to full size therewithin, said head member being curved to maintain normal self shape-retaining characteristics thereof, a flat elongated and locally deformable handle of heavier gauge than the head member and integrally formed with said head member, and longitudinally extending aligned ribs integrally formed on opposite faces of said handle, said ribs at one end merging with said head member, said handle and ribs being sufficiently rigid to direct said head member within the vessel while at the same time being capable of flexing under local pressure to permit the entry thereof into irregularly shaped vessels, said head member, handle and ribs being integrally formed of a thermoplastic having physical properties similar to polyethylene, said handle and ribs at the ends remote from said head member each being integrally formed with enlargements provided wiht curved edges crossing each other and forming scraping edges when the implement is inverted for removing crusted deposits at inaccessible areas of the vessel.

5. A cleaning implement as set forth in claim 4 wherein said ribs and handle adjacent said arcuate scraping edges are integrally formed with an enlarged portion having a transverse bore therethrough adapted to receive therewithin a swabbing element to cooperate with said curved edges for swabbing said inaccessible areas of the vessel.

6. A cleaning implement comprising a locally deformable and pressure-sensitive head member of relatively thin gauge and having scraping edges adapted to engage the side and bottom walls of the vessel, said head member being integral and of blade form and curved about the longitudinal axis thereof to maintain normal self shape-retaining characteristics and being capable of being rollably compressed about said axis when entering the narrow confines of a vessel and returning to original condition when relieved of said confines, and an elongated solid handle integrally formed with said head member, said elongated handle being locally deformable and of thicker gauge than said head member, the handle and head member being formed of similar thermoplastic material.

7. A cleaning implement comprising a locally deformable and pressure-sensitive integral and bladed form of head member of relatively thin gauge and having scraping edges adapted to engage the side and bottom walls of the vessel, said head member being integral and of blade form and curved about the longitudinal axis thereof to maintain normal self shape-retaining characteristics and being capable of being rollably compressed when entering the narrow confines of a vessel and returning to original condition when relieved of said confines, and an elongated solid handle integrally formed with said head member, said elongated handle being locally deformable and of thicker gauge than said head member, the handle and head member being formed of the same thermoplastic material, said head member having a bore along the longitudinal axis thereof to facilitate curving thereabout and adapted to engage a swabbing element to cooperate with said scraping edges, said bore being disposed intermediate the height of said head member.

References Cited in the file of this patent

UNITED STATES PATENTS

| | | |
|---|---|---|
| 330,619 | Reed | Nov. 17, 1885 |
| 787,706 | Volckening | Apr. 18, 1905 |
| 1,235,038 | Klinka | July 31, 1917 |
| 1,291,131 | Radel | Jan. 14, 1919 |
| 1,898,690 | Schacht | Feb. 21, 1933 |
| 2,188,114 | Hubbard | Jan. 23, 1940 |
| 2,214,982 | Wylie | Sept. 17, 1940 |
| 2,536,311 | Rojakovick | Jan. 2, 1951 |
| 2,567,923 | Burke | Sept. 18, 1951 |